US012448253B2

(12) United States Patent
Bansal et al.

(10) Patent No.: US 12,448,253 B2
(45) Date of Patent: Oct. 21, 2025

(54) SYSTEM AND METHOD FOR HANDLING SEMI-FINISHED METAL PRODUCTS

(71) Applicant: ArcelorMittal, Luxembourg (LU)

(72) Inventors: Akshay Bansal, Maizières-lès-Metz (FR); Benjamin Boissiere, Metz (FR); Gérard Griffay, Coincy (FR); Pierre Georges, Laquenexy (FR)

(73) Assignee: ArcelorMittal, Luxembourg (LU)

( * ) Notice: Subject to any disclaimer, the term of this patent is extended or adjusted under 35 U.S.C. 154(b) by 871 days.

(21) Appl. No.: 17/764,307

(22) PCT Filed: Oct. 2, 2019

(86) PCT No.: PCT/IB2019/058387
§ 371 (c)(1),
(2) Date: Mar. 28, 2022

(87) PCT Pub. No.: WO2021/064451
PCT Pub. Date: Apr. 8, 2021

(65) Prior Publication Data
US 2022/0371859 A1 Nov. 24, 2022

(51) Int. Cl.
*B66C 1/44* (2006.01)
*B66C 13/08* (2006.01)

(52) U.S. Cl.
CPC .............. *B66C 1/447* (2013.01); *B66C 13/08* (2013.01)

(58) Field of Classification Search
CPC ........... B66C 1/447; B66C 13/08; B66C 1/30; B66C 1/42; B66F 9/12
USPC ................................ 294/68.26, 81.61, 81.62
See application file for complete search history.

(56) References Cited

U.S. PATENT DOCUMENTS

| | | | |
|---|---|---|---|
| 3,680,907 A | 8/1972 | Siegwart et al. | |
| 3,944,272 A * | 3/1976 | Fathauer | B66C 1/101 294/81.4 |
| 4,492,402 A * | 1/1985 | Bradley | B66C 1/485 294/103.2 |
| 4,496,275 A * | 1/1985 | Harp | B66C 13/08 414/754 |
| 4,662,669 A * | 5/1987 | Erickson | B01J 19/00 294/68.27 |
| 5,617,964 A * | 4/1997 | Lucking | B25J 17/0216 212/319 |
| 2002/0190533 A1 | 12/2002 | Scarborough et al. | |

FOREIGN PATENT DOCUMENTS

| | | |
|---|---|---|
| AU | 3455578 A | 10/1979 |
| DE | 2811645 A1 | 9/1978 |
| GB | 564101 A | 9/1944 |
| GB | 1068394 A | 5/1967 |

OTHER PUBLICATIONS

Search Report of PCT/IB2019/058387 dated Dec. 3, 2020.

* cited by examiner

*Primary Examiner* — Paul T Chin
(74) *Attorney, Agent, or Firm* — Davidson Kappel LLC

(57) ABSTRACT

A system (1) for handling semi-finished metal products (5) including a gripper (3) suitable to grasp at least one semi-finished product (5) laid on a surface (40), a conveyor configured to lift the gripping means (3) from a low position towards a high position, and a tilter (2) configured to rotate the gripper (3) in their high position around a rotation axis (X-X').

15 Claims, 8 Drawing Sheets

SYSTEM AND METHOD FOR HANDLING SEMI-FINISHED METAL PRODUCTS

TECHNICAL FIELD

The invention falls within the field of metallurgy and, more particularly, within the field of the handling and manipulation of semi-finished metal products, such as slabs, plates, coils, blooms, billets or ingots.

The invention relates to a system and a method for handling semi-finished metal products, such as slabs, plates, coils, blooms, billets or ingots.

BACKGROUND

During the manufacture of metals such as steel, whether this be via the mining sector in which the steel is manufactured from iron ore and coke, or via the electrical sector which allows the recycling of steel, the liquid metal obtained in the blast furnaces or in the electric-arc furnaces according to the sector is then graded and then poured into vertical molds which are strongly cooled in order to continuously cool and solidify the surface of the liquid metal.

The metal, still liquid at its core, flows continuously and the metallic stream obtained is guided by rolls, which are likewise cooled, to pass from a vertical position into a substantially horizontal position.

This poured metal casting is cut for example by flame cutting to form semi-finished metal products which can then be used for the manufacture of finished products. Example of such semi-finished products are slabs, plates, coils, blooms, billets or ingots.

These semi-finished products are heavy and bulky. For example, slabs are generally of rectangular cross section and are subsequently used in the manufacture of coils of sheet metal of several hundreds of meters long. These still-hot semi-finished products are stacked on a surface for later use, for example on the floor.

SUMMARY OF THE INVENTION

It is a particularly arduous task not only to move these semi-finished products but also to manipulate them, for example to turn a slab over to access all its surfaces.

Handling systems of the tong type designed to grasp the slabs via one of their longitudinal sides are known. These tongs, or grippers, may then set each slab down on a tilt truck designed to rotate the slab through 90°, namely from a substantially horizontal position into a substantially vertical position.

However, these handling systems are heavy and bulky, chiefly because of the high number of independent devices that make up the handling system.

The invention thus seeks to propose a handling system that is compact and occupies little space, suitable of grasp and manipulate semi-finished metal products such as slabs, plates, coils, blooms, billets or ingots, particularly able to lift, move, rotate or turn over the said lifted slabs.

The invention also proposes a method for handling semi-finished metal products such as slabs, plates, coils, blooms, billets or ingots using the handling system of the invention.

To this end, the invention relates to a system for handling semi-finished metal products comprising at least gripping means suitable to grasp at least one semi-finished product laid on a surface, movement means configured to at least lift said gripping means from a low position towards a high position, and tilting means configured to rotate said gripping means in their high position around a rotation axis.

The system of the invention may also include the following optional characteristics considered individually or according to all possible combination of techniques:

- The rotation axis passes through the center of gravity of the gripping means.
- The gripping means comprise at least one tong able to grasp the semi-finished product via its longitudinal sides.
  - The gripping means comprise several tongs connected to one another by at least one longitudinal connecting element.
  - Each tong comprises two opposing jaws among which at least one jaw is connected to means for achieving translational movement relative to the opposite jaw so as to clamp the semi-finished product between the said jaws.
  - The tilting means comprise at least a first tilting device comprising at least:
    - first and second vertical beams whose respective first ends are connected in rotation with the gripping means,
    - a first connection member which extends from the first beam to the second beam while being connected in rotation with the said first and second beams, and while being mounted on a first rotation point situated in a plane passing through the rotation axis,
    - a second connection member which extends from the first beam to the second beam, being connected in rotation with the said first and second beams, and being mounted on a second rotation point situated in the plane passing through the rotation axis, said second rotation point being distinct from the first rotation point,
- in which system the two vertical beams and the first and second connection members form a deformable parallelogram,
- the first tilting device further comprising a movement member configured to deform the parallelogram around the first and second rotation points, thereby causing the gripping means to tilt around the rotation axis,
- in which system, the first tilting device extends above the gripping means.

The tilting means comprise a second tilting device comprising at least:

- first and second vertical beams whose respective first ends are connected in rotation with the gripping means,
- a first connection member which extends from the first beam to the second beam while being connected in rotation with the said first and second beams, and while being mounted on a third rotation point situated in the plane passing through the rotation axis,
- a second connection member which extends from the first beam to the second beam, being connected in rotation with the said first and second beams, and being mounted on a fourth rotation point situated in the plane passing through the rotation axis, said fourth rotation point being distinct from the third rotation point, in which system the two vertical beams and the first and second connection members form a deformable parallelogram, the second tilting device further comprising a movement member configured to deform the parallelogram around the third and fourth rotation points, thereby causing the gripping means to tilt around the rotation axis, in which system the deformable parallelogram of the first tilting device extends in a plane parallel to the plane of the deformable parallelogram of the second tilting device, and in which system, the second tilting device extends above the gripping means.

The gripping means and the tilting means form a first handling device, and the system comprises a second handling device independent of the first handling device and symmetric to the latter in a plane perpendicular to the surface, the second handling device comprising second gripping means and second tilting means for tilting the second gripping means around a second rotation axis symmetric to the rotation axis of the first gripping means around the plane of symmetry, the tongs of the two handling devices being positioned in a staggered configuration, the system further comprising a transverse movement device configured to move the first and second gripping means transversely to the rotation axis so align them and allow the lifted semi-finished product to be transferred from one gripping means to the other.

The movement means comprise lifting means configured to lift the gripping means and means of achieving translational movement of the said system in a plane parallel to the surface.

The movement means comprise a support structure of the travelling crane type, at least one hoist designed to be connected to the support structure via a trolley able to be moved translationally in a direction perpendicular to the direction of travel of the support structure, said hoist comprising at least one lifting cable for lifting the gripping means.

The cable is in the vertical plane passing through the rotation axis.

At least the gripping means and the tilting means are protected from the heat and radiation which may be caused by the semi-finished product by a heat shield.

The system comprises a hydraulic unit positioned above the gripping means and between the movement means and the tilting means, and configured to actuate at least the tilting means and the gripping means.

The invention also provides a method for handling semi-finished metal products initially laid on a surface, comprising at least the steps of:

grasping the semi-finished product with gripping means (step i), lifting the semi-finished product off the surface with movement means able to lift the gripping means from a low position towards a high position (step ii), and tilting the lifted semi-finished product around a rotation axis with tilting means configured to rotate the gripping means in their high position around said rotation axis (step iii).

The method of the invention may also comprise the following optional characteristics considered individually or according to all possible combination of techniques:

The method comprises after step iii following additional successive steps of:

iv. Actuating the movement means to move the gripping means grasping the semi-finished product, over a semi-finished product reception zone;

v. Actuating the movement means to lower the gripping means and set the semi-finished product down in the receiving zone in a perpendicular position, followed by actuation of the gripping means to release the semi-finished product;

vi. Actuating the movement means to lift the gripping means, then actuating the tilting means to rotate the gripping means towards their initial position, so that another semi-finished product laid on the surface can be grasped.

The semi-finished product in a substantially vertical position is set down in step vi in a heat recuperation system.

The gripping means and the tilting means of the system form a first handling device, and wherein the system comprises a second handling device independent of the first handling device and symmetric to the latter in a plane perpendicular to the surface, the second handling device comprising second gripping means and second tilting means for tilting the second gripping means around a second rotation axis symmetric to the rotation axis of the first gripping means in the plane of symmetry, which method comprises, after step iii, the following successive steps:

iv. Actuating the second tilting means to rotate the second gripping means around the second rotation axis, so that these means are able to grasp the semi-finished product that has been grasped and suspended in a vertical position by the gripping means of the first handling device;

v. Actuating the second gripping means to grasp the semi-finished product in a vertical position, followed by actuation of the gripping means of the first handling device in order to release the semi-finished product;

vi. Actuating the second tilting means to rotate the second gripping means around the second rotation axis so that the semi-finished product turns into a position that corresponds to the semi-finished product having been turned over with respect to its initial position;

vii. Actuating the movement means to set the turned-over semi-finished product down on the surface.

The semi-finished metal product is a slab, a plate or a coil.

The semi-finished metal product is made of steel.

BRIEF DESCRIPTION OF THE DRAWINGS

Other characteristics and advantages of the invention will be apparent in the below descriptions, by way of indication and in no way limiting, and referring to the annexed figures among which:

FIGS. 3 to 6 illustrates the kinetics of the handling of a slab according to the method of the invention and using the handling system of the invention, viewed from the side following arrow F of the system of FIG. 1 and for which:

FIG. 3 illustrates a step of the method of the invention wherein the movement means are actuated in order to lower the gripping means;

FIG. 4 illustrates a further step of the method of the invention wherein the gripping means are actuated to grasp the slab;

FIG. 5 illustrates a further step of the method of the invention wherein the movement means are actuated to lift the slab off the floor;

FIG. 6 illustrates a view in which the gripping means have rotated to bring the suspended slab into a vertical position;

DETAILED DESCRIPTION

First, it is noted that on the figures, the same references designate the same elements regardless of the figure on which they feature and regardless of the form of these elements. Similarly, should elements not be specifically referenced on one of the figures, their references may be easily found by referring oneself to another figure.

It is also noted that the figures represent mainly two embodiments of the object of the invention but other embodiments which correspond to the definition of the invention may exist.

The system 1 of the invention notably finds application in the field of metallurgy and, more particularly, in the movement of semi-finished metal products 5 such as slabs, plates, coils, blooms, billets or ingots. The following description will only refer to a slab as semi-finished metal product without limiting the scope of the invention on this matter.

Figure 2:
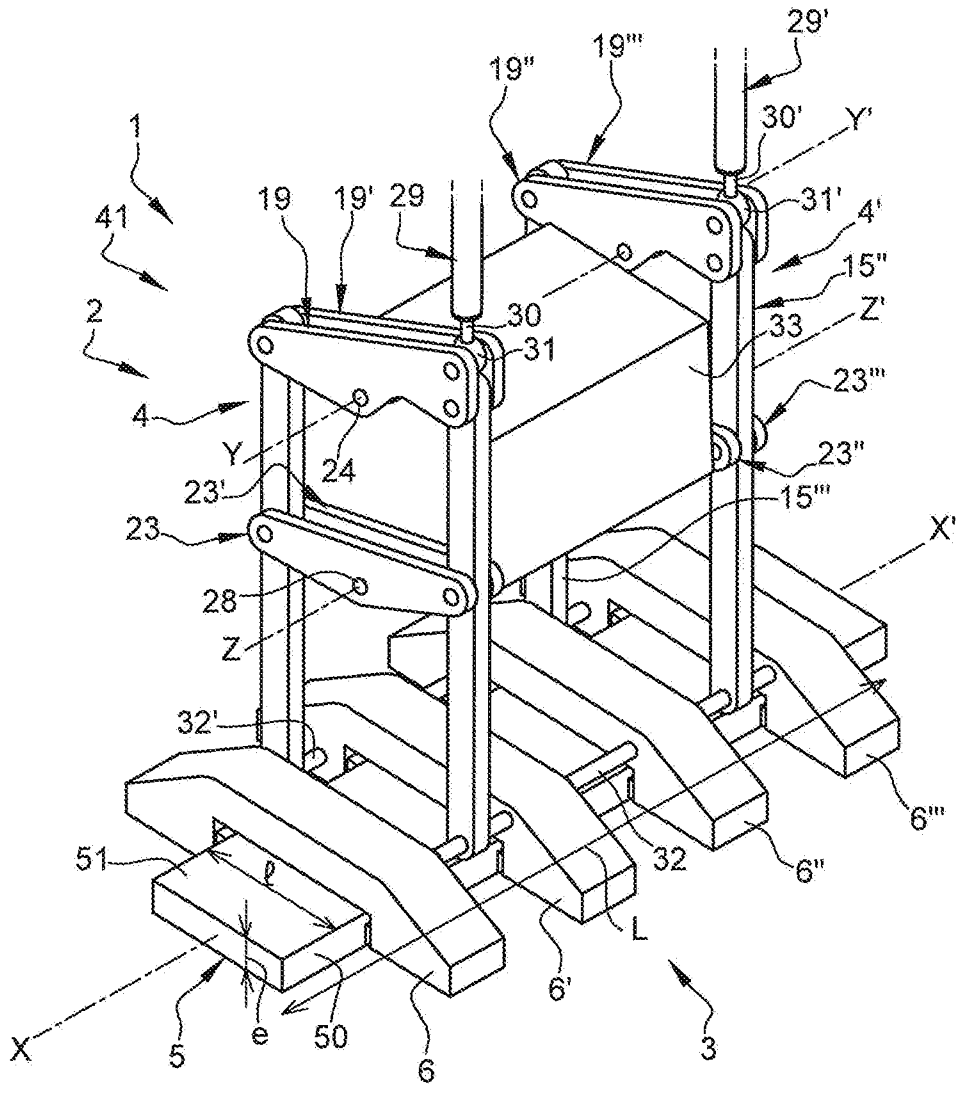
FIG. 2 is a perspective view of a part of the system of FIG. 1.

As is depicted in FIG. 2, a slab 5 has the shape of a straight paving stone of rectangular cross section having a length L, a width I and a thickness e. In the remainder of the description, the large face 51 is defined as being the surface extending in the length L and width I directions of the slab 5, and the small face 50 is defined as the surface extending in the length L and thickness e directions of the slab 5.

The slab handling system 1 of the invention therefore makes it possible, using a single compact system, to grasp at least one slab 5 for example laid on a surface 40 on its large face 51, lift it and turn it while it is raised, so that it can be moved to a receiving zone intended for this purpose and then set down on its small face 50, which is to say its side.

Typically, the surface on which the slab 5 is initially laid may be the floor 40 (see, e.g., FIG. 3), or any other kind of surface on which the slab 5 may be laid before being grasped by the system 1. For example, the slab 5 may be laid on an elevated surface in order to facilitate its grasping by the handling system 1. The following description will only refer to a floor as the surface where the slab 5 is initially laid on without limiting the scope of the invention on this matter.

The slab handling system 1 of the invention makes also possible to turn over a slab, meaning to turn a slab over an angle of 180°.

Figure 1:
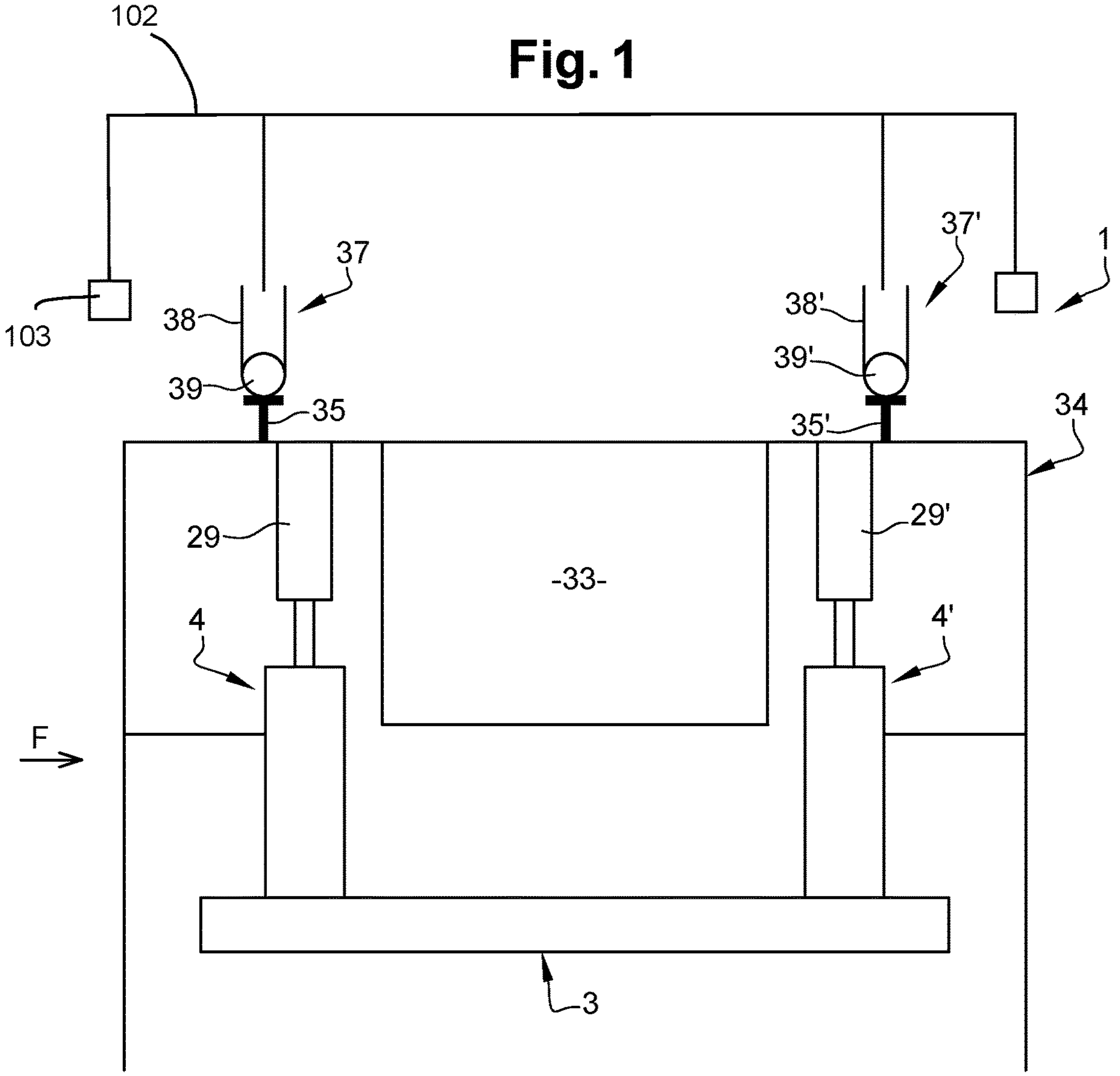
FIG. 1 is a schematic face-on view of part of the handling system according to a first embodiment of the invention.

With reference to FIG. 1, the handling system 1 of the invention according to a first embodiment comprises a chassis 34, means 3 for gripping at least one slab 5 laid on the floor 40 on its large face 51, tilting means 2 (see, e.g., FIG. 2) connected in an articulated manner to the chassis 34 and to the gripping means 3 and configured to rotate said gripping means 3 around a rotation axis X-X'. The assembly comprising the gripping means 3 and the tilting means 2 forms a handling device 41 (see, e.g. FIG. 2).

The handling system 1 further comprises movement means connected to the chassis 34 and configured to move the gripping means 3 around in space. More specifically, the movement means comprise lifting means 37, 37' configured to move the gripping means 3 vertically, and translation means for bringing about a translational movement of the handling system 1, which are configured to move the gripping means 3 in a plane parallel to the floor 40.

In the remainder of the description, the term “horizontal” will be used to define the movement of the gripping means 3 in this plane parallel to the floor 40, but it goes without saying to a person skilled in the art that the handling system 1 is operational on floor 40 that is neither optimally horizontal nor optimally flat.

The handling system 1 finally comprises energy supply means connected to control means, supply means preferably comprising a hydraulic and/or pneumatic unit 33 attached to the chassis 34 and configured to actuate at least the gripping means 3 and the tilting means 2. Alternatively, supply means comprise an electrical and/or mechanical unit 33 attached to the chassis 34.

The gripping, tilting and movement means will now be described with reference to FIGS. 2 to 6.

According to the invention, the gripping means 3 comprise a plurality of tongs 6, 6', 6" and 6'", for example four tongs as illustrated in FIG. 2, configured to grasp the slab 5 via its small faces 50.

Each tong 6-6'" comprises a main body and a recess 61 (see, e.g., FIG. 3) to accept the slab 5. Each tong 6-6'" further comprises two jaws 7, 8 facing one another. In order to allow slabs 5 of different widths to be grasped and to ensure optimal clamping, at least one of the jaws 7, preferably both 7, 8, is mounted with the ability to move translationally on a movement device 11 of the piston ram type powered by the hydraulic unit 33 (see, e.g., FIG. 1). This ram 11 is incorporated into the tong body and the piston 12 is attached to a face of the mobile jaw 7 that is the opposite face to the bearing face of the said jaw 7, so that the ram 11 moves the jaws 7, 8 closer together or further apart in order to clamp or release the slab 5. To ensure that the movement of the mobile jaw 7 is rectilinear, this jaw 7 is attached to a sliding member 9 designed to slide along a guide 10 attached to the tong body.

In order to improve the clamping and positioning of the slab 5 in the recess 61 in the tong 6-6'", the contact surfaces of the jaws 7, 8 are covered with pads 13. Furthermore, the lower surface of the tong body, which is intended to face the grasped slab 5, is also covered with a plurality of pads 13. These pads 13 are wearing parts that can be easily replaced.

The tongs 6-6'" of the gripping means 3 are connected to one another by longitudinal connecting elements 32, 32', preferably longitudinal connecting bars, the tongs 6-6'" also being evenly spaced.

According to the invention, and in order to minimize the oscillations of the gripping means 3 and of the rest of the handling system 1, but also reduce the forces needed for tilting the gripping means 3, the center of gravity of the gripping means 3 is comprised in a vertical plane P that passes through the rotation axis X-X'.

In order to best adjust the position of the center of gravity of the gripping means 3, each tong 6-6'" comprises a counterweight 14 preferably positioned at an end part of the said tong 6-6'". Advantageously, the counterweight 14 is mounted with the ability to effect translational movement on a movement device of the controlled hydraulic ram type in a direction parallel to the longitudinal axis of the tong 6-6'". The control means, acting via the hydraulic unit 33 on the actuation of the movement devices respectively connected to the counterweights 14 of the relevant tongs 6-6'", precisely control the position of the said counterweights 14 in order to position the center of gravity of the gripping means 3 as close as possible to the vertical plane P passing through the rotation axis X-X'.

According to the invention, when each tong 6-6'" comprises two translationally mobile jaws 7, 8, a fixed part of the gripping means 3 and/or the chassis 34 may comprise slab detection means, for example optical sensors or cameras in the visible and/or infrared domain, which are connected to the control means. The data captured by these sensors or cameras are transmitted to the control means which use them to control the hydraulic unit 33 in order to bring the center of gravity of the gripping means 3 just over the center of gravity of the slab 5 that is to be grasped. Once grasped, the center of gravity of the assembly formed by the gripping means 3 and the slab 5 grasped thereby remains in the vertical plane P passing through the rotation axis X-X', and this further contributes to limiting the oscillations of the handling system 1 but also to reducing the forces needed for tilting the gripping means 3 loaded with the slab 5.

In a way that is particularly advantageous at minimizing the oscillations and the forces required for the tilting, the rotation axis X-X' passes through the center of gravity of the gripping means 3 loaded with the slab 5 and is coincident with the longitudinal axis of the grasped slab 5.

According to the invention, the tilting means 2 will now be described with reference to FIG. 2.

The tilting means 2 comprise first and second vertical beams 15, 15' whose respective first ends 17, 17' are connected in rotation with the gripping means 3, preferably to the longitudinal connecting bars 32, 32'.

The tilting means also comprise at least a first connection member 19, preferably a first plate, which extends from the first beam 15 to the second beam 15' while being connected with the ability to rotate to the said first and second beams 15, 15' around an axis Y-Y' parallel to the rotation axis X-X' of the gripping means 3. This first member 19 is thus mounted on a first rotation point 24 attached to the chassis 34, said first rotation point 24 being advantageously situated in the vertical plane P passing through the rotation axis X-X' of the gripping means 3. Off course the axis Y-Y' passes through the first rotation point 24.

Preferably, and as depicted in FIG. 2, the tilting means 2 comprise two identical first plates 19, 19' positioned one on each side of the first and second beams 15, 15'.

The tilting means 2 also comprise at least one second connection member 23, preferably a second plate, which extends from the first beam 15 to the second beam 15', while being connected with the ability to rotate to the said first and second beams 15, 15' around an axis Z-Z' parallel to the rotation axis X-X' of the gripping means 3. This second member 23 is further mounted on a second rotation point 28 attached to the chassis 34, which second rotation point 28 is fixed distinct from the first rotation point 24. Furthermore, the second rotation point 28 is advantageously situated in the vertical plane P passing through the rotation axis X-X' of the gripping means 3. Off course the axis Z-Z' passes through the second rotation point 28.

Preferably, and as depicted in FIG. 2, the tilting means 2 comprise two identical second plates 23, 23' positioned one on each side of the first and second beams 15, 15'.

The first and second beams 15, 15', and the first and second plates 19, 19', 23, 23', form a deformable parallelogram. The tilting means 2 further comprise a movement member 29 of the controlled ram type, whose cylinder is secured to the chassis and whose piston 30 comprises at its end a ball joint 31 mounted with the ability to rotate on the deformable parallelogram, preferably between the two first plates 19, 19'. The controlled movement of the piston 29 therefore deforms the parallelogram around the two rotation points 24, 28, causing the gripping means 3 to rotate.

In the remainder of the description, the assembly formed by the deformable parallelogram and the movement member will be referred to as a tilting device 4 extending above the gripping means 3.

Preferably, and as depicted in FIG. 2, the tilting means 2 comprise two tilting devices 4, 4' having the same structure, meaning two vertical beams 15'', 15''', two first plates 19'', 19''' rotating around a third rotation point with axis Y-Y' passing through said third rotation point, and two second plates 23'', 23''' rotating around a fourth rotation point with axis Z-Z' passing through said fourth rotation point. This additional tilting device 4' make the rotating of the gripping means 3 more secure. These two tilting devices 4, 4' therefore both form deformable parallelograms extending in mutually parallel planes and which are positioned above the gripping means 3. More specifically, the first tilting device 4 is positioned between an end tong 6 and the adjacent tong 6', and the second tilting device is positioned between the opposite end tong 6''' and the tong 6'' adjacent to the latter.

Figure 7:
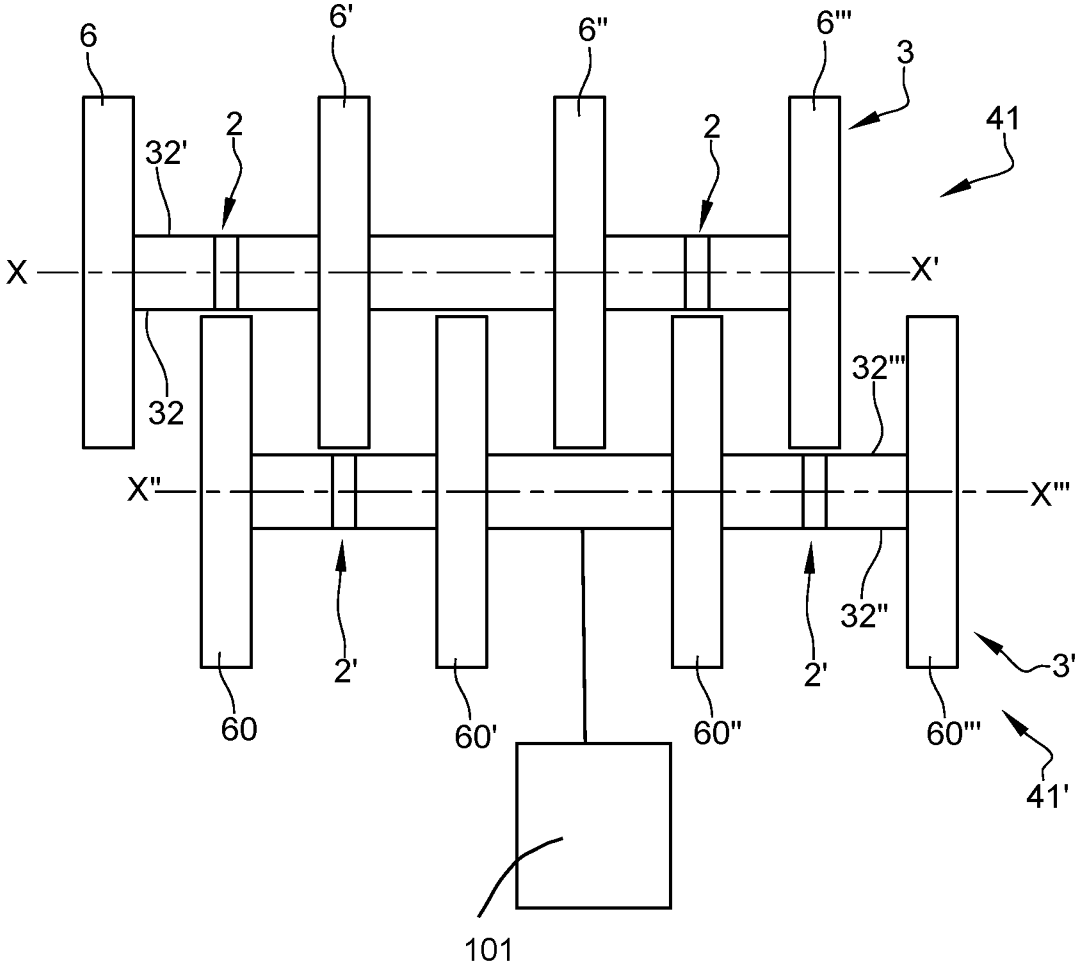
FIG. 7 is an above view of the first and second handling devices of the invention according to a second embodiment.
Figure 8:
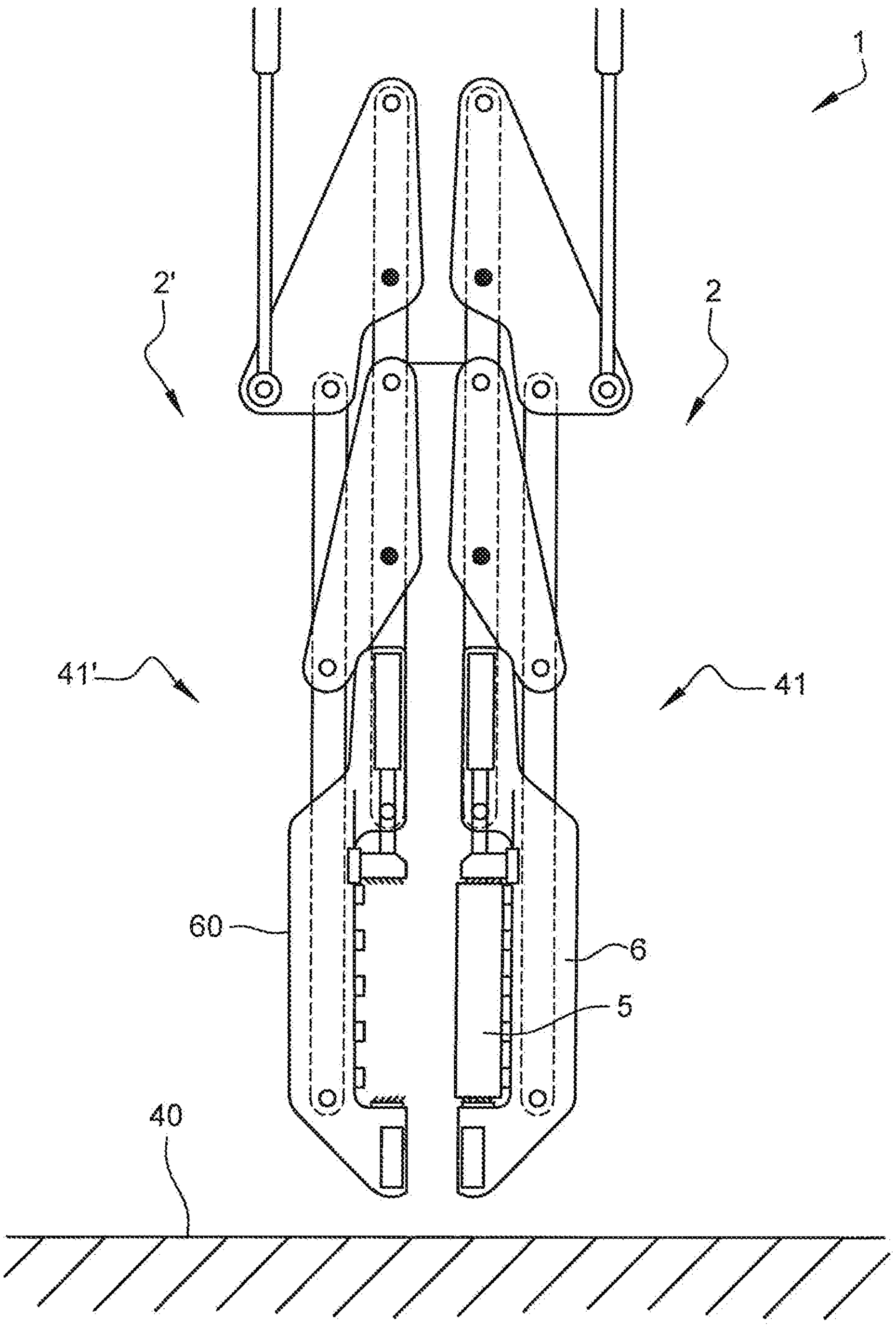
FIG. 8 is a side view of the handling system with the first and second handling devices of the invention according to a second embodiment.

According to a second embodiment depicted in FIG. 7 and FIG. 8, the handling system 1 comprises a second handling device 41' symmetrical to the first handling device 41 in a plane of symmetry. The second handling device 41' thus comprises second gripping means 3' and second tilting means 2', the tongs 6-6'''; 60-60''' of the two handling devices 41, 41' being connected via connecting bars 32'', 32''' and positioned in a staggered configuration and the second gripping means 3' being able to tilt around a second rotation axis X''-X''' symmetrical to the rotation axis X-X' of the first gripping means 3 in the vertical plane of symmetry. Furthermore, the second handling device 41' is connected to a translational-movement device (illustrated schematically in FIG. 7) configured to move the second gripping means 3' transversely to the rotation axis X''-X''' and independently of the first gripping means 3, so as to move the first and second gripping means 3, 3' closer to one another or further apart.

The purpose of this second handling device 41' which is symmetrical to the first 41 will be specified later on, in connection with the description of a handling method according to the invention.

According to the invention, the movement means will now be described with reference to FIG. 1.

The movement means as specified hereinabove comprise lifting means 37, 37' and means for achieving translational movement in a horizontal plane shown schematically for example as a crane 102 and trolley 103.

According to a preferred embodiment which is also partially depicted in FIG. 1, the lifting means 37, 37' are formed by a hoist comprising lifting tackle whose a first part, formed by pulley blocks (not depicted) is connected to a support structure of the travelling crane type (not depicted) forming part of the movement means, and whose a second part, formed by pulleys 39, 39' (see FIG. 1) is connected to the chassis 34 thanks to fixing means 35, 35'. The pulley blocks and the pulleys 39, 39' have passing through them at least one cable 38, 38' creating, for example, a reeving system with four cable parts. The control means are also configured to operate this hoist which lifts or lowers the chassis 34, and thereby the gripping means 3.

The travelling crane is substantially U-shaped and comprises two legs joined together by a substantially horizontal portion. This crane is suitable to translational movement in a first direction via motorized wheels mounted at the end of the legs, and the hoist is mounted on a trolley that can be moved along the horizontal part of the travelling crane in a second direction perpendicular to the first direction. The travelling crane and the trolley form the means of achieving translational movement of the system 1 in the horizontal plane. Any other device adapted to support and travel the handling system 1 may be used in place of the travelling crane.

Particularly advantageously in order to further limit the oscillations of the handling device, the cables 38, 38' of the hoist extend in the vertical plane P through which the rotation axis X-X' of the gripping means 3 passes.

Finally, the control means and the hydraulic unit 33 are positioned above the gripping means 3 and the tilting means 2 (FIG. 1). Furthermore, the gripping means 3, 3', the tilting means 2, 2' and the movement member 29, 29' are covered with a protective heat shield. In that way, the handling system 1 of the invention is particularly suited to the handling of slabs 5 that are still hot, which means to say slabs that are at a temperature of around 1000° C.

A method for handling semi-finished metal products 5 using the handling system 1 of the invention will now be described with reference to FIGS. 3 to 6.

Figure 3:
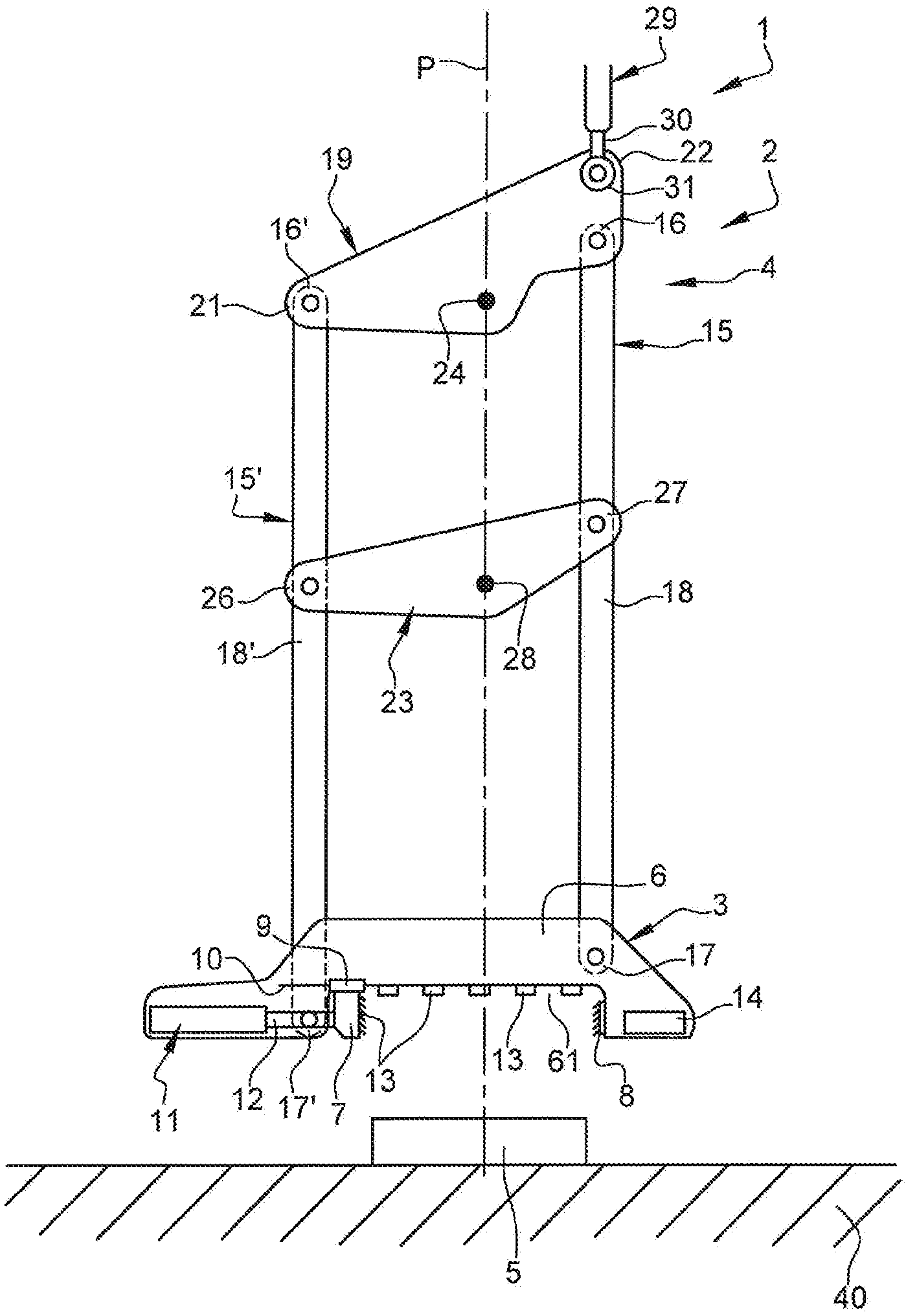

During the course of the first step and with reference to FIGS. 1 and 3, the movement means and, more particularly, the means of achieving translational movement of the system in the horizontal plane, are actuated by the control means so as to move the gripping means 3 over the slab 5 that is to be grasped, which slab 5 is resting on the floor 40 or on a pile of slabs 5, laying on its large face 51. If the handling system has slab detection means, the data generated by these means and sent to the control means allow the center of gravity of the gripping means 3 to be positioned precisely over the center of gravity of the slab 5. Ideally, the cables 38, 38' of the lifting means 2, the rotation axis X-X', the center of gravity of the gripping means 3 and the longitudinal axis of the slab 5 are all comprised in the same vertical plane P.

During the second step, the control means actuate the lifting means 37, 37' which lower the gripping means 3 until the slab 5 that is to be grasped is housed in the recess 61 of the tong body and comes into contact with the pads 13 formed on the surface of the recess 61 facing the slab 5.

Figure 4:
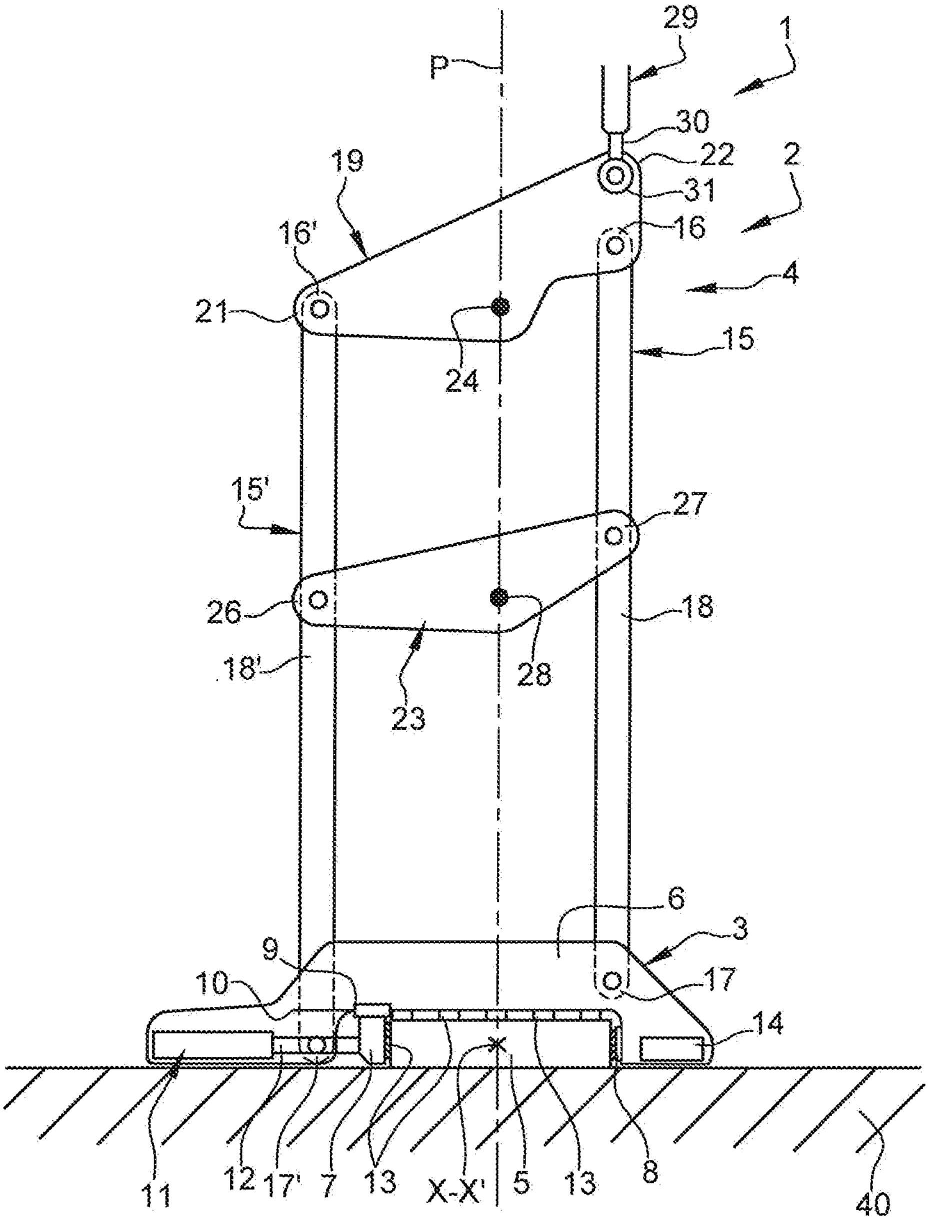

During the third step depicted in FIG. 4, the control means actuate the rams 11 whose pistons 12 are secured to the mobile jaws 7 of the various tongs 6-6''', so that opposing jaws 7, 8 move closer together to clamp and firmly grasp the slab 5.

Figure 5:
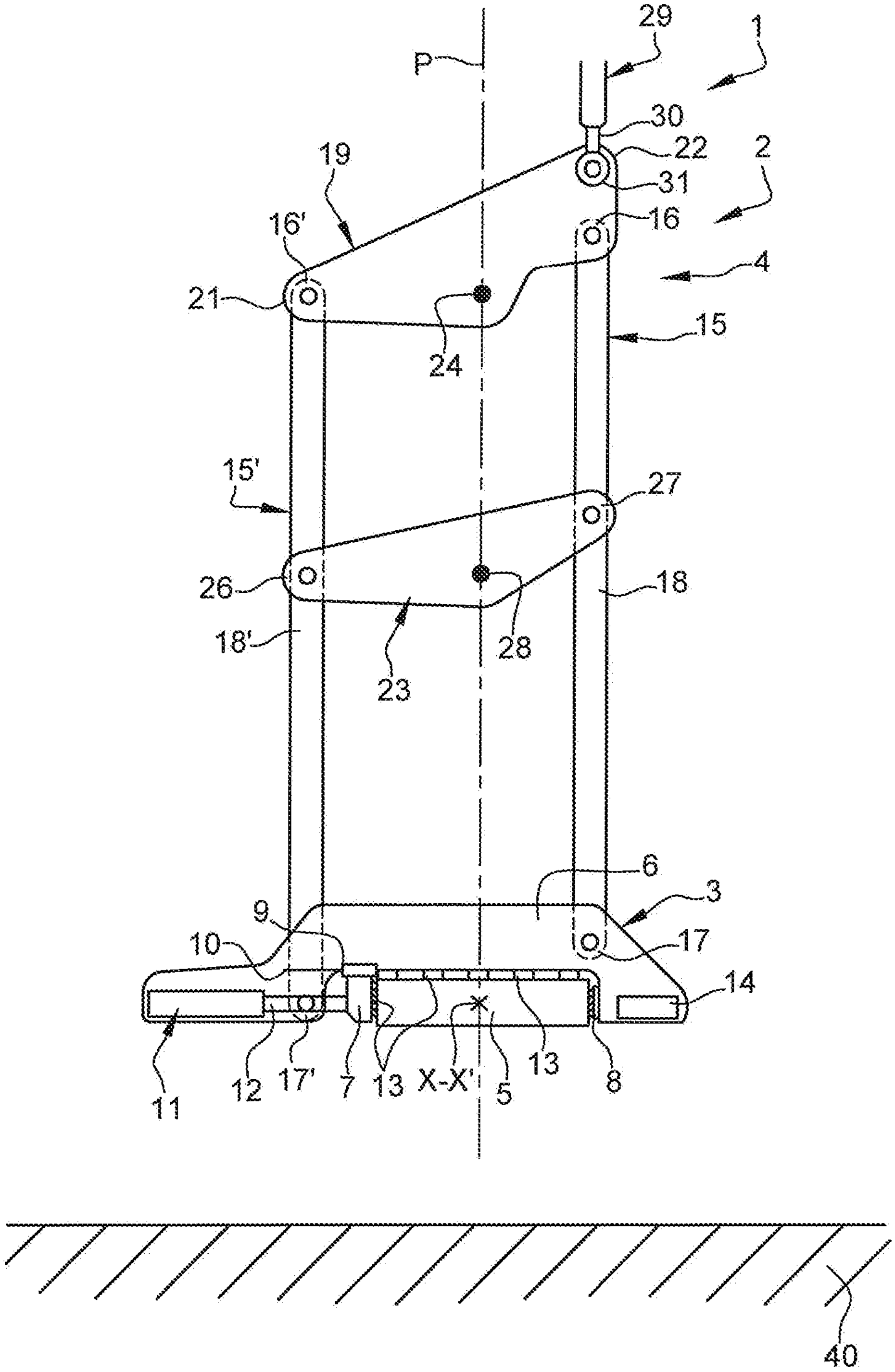

During the fourth step depicted in FIG. 5, the control means actuate the lifting means 37, 37' which lift the gripping means 3 off the floor 40. The slab 5 is therefore raised off the floor 40 in a position parallel to the floor 40. In the remainder of the description, it will be taken that the slab 5 grasped and raised into this position is horizontal.

Figure 6:
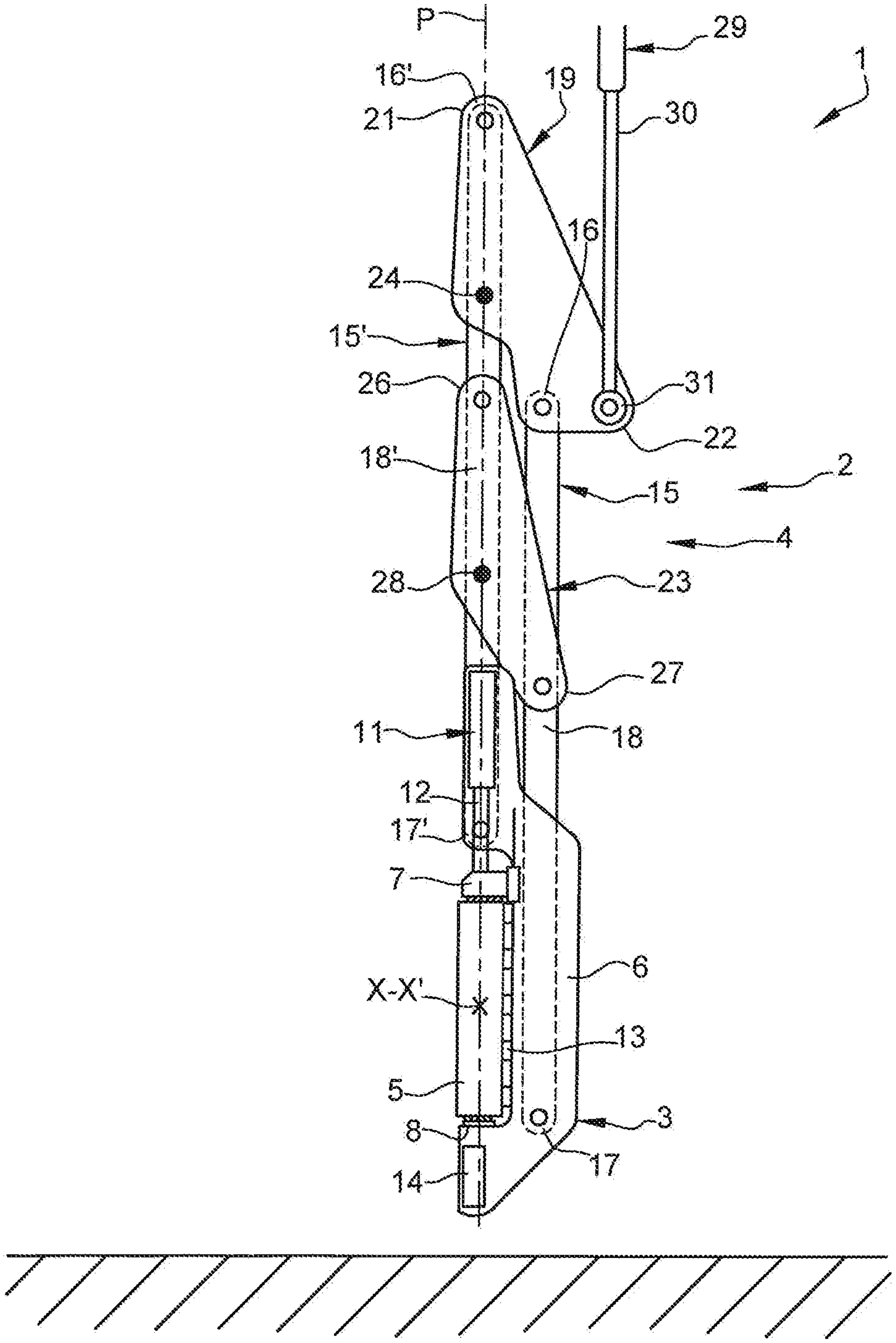

During the fifth step, the control means actuate the rams 29, 29' connected to the tilting devices 4, 4', thereby causing the gripping means 3 to rotate. The grasped and lifted slab 5 then turns from its horizontal position towards a position in which the small face 50 of the slab 5 is parallel to the floor 40, as depicted in FIG. 6. In the remainder of the description, it will be taken that the slab 5 grasped and raised into this position is vertical.

The handling system 1 of the invention therefore makes it possible to implement a handling method that makes it possible at least to grasp one or more horizontal slabs 5, lift them up off the floor 40 then turn them into a vertical position while the said slab 5 remains raised.

The method may thereafter comprise other steps dependent on what use is to be made of these slabs 5.

According to a first example, as the handling system 1 is able to grasp hot slabs, which means to say slabs 5 whose temperature is around for example 1000° C., one conceivable use notably for the first embodiment of the handling system 1 is to allow the recuperation of the heat given off by these slabs 5 rather than leaving them to cool in the open air and allowing their heat to dissipate into the surroundings.

To this end, and during a sixth step, the control means actuate the movement means and, more particularly, the means achieving translational movement in the horizontal plane, so as to move the gripping means 3 clamping the slab 5 into a vertical position over an opening of a heat recuperation device.

Preferably, this device is a fluidized bed which is designed to accept the hot slabs 5 in a vertical position. Furthermore, since the control means and the hydraulic unit 33 are formed some distance away from the gripping means 3, these do not come into contact with the fluidized bed.

During a seventh step, the control means actuate the lifting means 37, 37' which lower the gripping means 3 until the small face 50 of the slab 5 comes to bear against a raised bottom wall of the fluidized bed.

During an eighth step, the control means actuate the rams 11 whose pistons 12 are attached to the mobile jaws 7 of the various tongs 6-6''', which opposing jaws 7, 8 move apart in order to release the vertical slab 5 placed in the bottom of the fluidized bed.

Finally, during the last step, the control means actuate the movement means, first of all the means of achieving translational movement, to move the gripping means 3 away from the slab 5, then the lifting means 37, 37' to lift the said gripping means 3 above the fluidized bed. The preceding steps are therefore potentially repeated to allow a plurality of slabs 5 to be inserted into the fluidized bed.

According to a second example connected with the second embodiment of the handling system 1 of the invention indicated schematically in FIG. 7 and FIG. 8, the handling system 1 facilitates the operations of surface treating the large faces 51 of the slabs 5.

Thus, after a first large 51 face of a slab 5 lying on the floor 40 has been treated, the handling system 1 grasps, lifts and rotates the slab 5 into the vertical position using the gripping means 3 of the first handling device 41 (following the first five steps of the method which were described hereinabove).

During a sixth step, the control means actuate the second tilting means 2' so that the second gripping means 3' rotate towards a position that renders them able to grasp the slab 5 in the vertical position held between the jaws 7, 8 of the tongs 6-6''' of the first gripping means 3.

During a seventh step, the control means actuate the device achieving translational movement of the second gripping means 3' so that the slab 5 finds itself in the recess of the tongs 60-60''' of the second gripping means 3'. The control means first of all actuate the rams whose pistons are attached to the mobile jaws of the various tongs 60-60''' of the second gripping means 3', so that the opposing jaws move closer together to clamp and firmly grasp the slab 5, and in a second phase the control means actuate the rams 11 whose pistons 12 are secured to the mobile jaws 7, 8 of the various tongs 6-6''' of the first gripping means 3 so that the opposing jaws 7, 8 move apart to release the slab 5.

During the eighth step, the control means actuate the device achieving translational movement of the second gripping means 3' so that they move away from the first gripping means 3, then the said control means actuate the second tilting means 4' which rotate the second gripping means 3' around the second rotate axis X''-X''' so that the slab 5 rotates towards another horizontal position corresponding to the slab 5 having been turned over with respect to the initial position.

Finally, during the last step, the control means actuate the lifting means 37, 37' to lower the second gripping means 3' until the slab 5 touches the floor 40 or touches another slab 5 placed at the top of a pile of slabs. The control means then actuate:

the rams that move the jaws so that the second gripping means 3' release the slab 5, then the lifting means 37, 37' to lift the second gripping means 3' and clear the surface 51 of the slab 5 that is to be treated.

The embodiments described hereinabove are entirely non-limiting and amendments can be made thereto without departing from the scope of the invention. By way of example, any other known type of movement means, notably a crane (shown schematically in FIG. 1 as 102) or lifting gear, can be considered. The handling system 1 is also suitable to handle several stacked slabs 5, by grasping via its small faces 50 the slab 5 that is furthest away from the handling system 1. Finally, it is also possible to provide a level on the gripping means 3 so as to optimize the horizontality and/or the verticality of the slabs 5 grasped and raised by the handling system 1.

The invention claimed is:

1. A system for handling semi-finished metal products comprising:

a gripper suitable to grasp at least one semi-finished product laid on a surface, an actuator configured to at least lift the gripper from a low position towards a high position, and tilting means configured to rotate the gripper in the high position around a rotation axis, wherein the tilting means includes at least a first tilting device including at least:

first and second vertical beams with respective first ends connected in rotation with the gripper, a first connector extending from the first vertical beam to the second vertical beam and being connected in rotation with the said first and second vertical beams and being mounted on a first rotation point situated in a plane passing through the rotation axis;

a second connector extending from the first vertical beam to the second vertical beam and being connected in rotation with the first and second vertical beams and being mounted on a second rotation point situated in the plane passing through the rotation axis, the second rotation point being distinct from the first rotation point, the first and second vertical beams and the first and second connectors forming a deformable parallelogram; and a further actuator configured to deform the parallelogram around the first and second rotation points thereby causing the gripper to tilt around the rotation axis, the first tilting device extending above the gripper.

2. The system as recited in claim 1 wherein the rotation axis passes through a center of gravity of the gripper.

3. The system as recited in claim 1 wherein the gripper includes at least one tong able to grasp the semi-finished product via longitudinal sides of the semi-finished product.

4. The system as recited in claim 3 wherein the at least one tong includes a plurality of tongs connected to one another by at least one longitudinal connector.

5. The system as recited in claim 3 wherein the at least one tong includes two opposing jaws including a first jaw connected to a yet further actuator for achieving translational movement relative to an opposite second jaw of the two opposing jaws so as to clamp the semi-finished product between the first and second jaws.

6. The system as recited in claim 3 wherein the tilting means includes a second tilting device including at least:

a further first and a further second vertical beams with respective further first ends connected in rotation with the gripper;

a further first connector extending from the further first beam to the further second beam and being connected in rotation with the further first and further second beams, and being mounted on a third rotation point situated in the plane passing through the rotation axis;

a further second connector extending from the further first beam to the further second beam and being connected in rotation with the further first and further second beams, and being mounted on a fourth rotation point situated in the plane passing through the rotation axis, the fourth rotation point being distinct from the third rotation point, the further first and further second vertical beams and the further first and further second connectors forming a further deformable parallelogram; and a second actuator configured to deform the parallelogram around the third and fourth rotation points, thereby causing the gripper to tilt around the rotation axis, the deformable parallelogram of the first tilting device extends in a plane parallel to a plane of the further deformable parallelogram of the second tilting device, the second tilting device extending above the gripper.

7. The system as recited in claim 3 wherein the gripper and the tilting means define a first handling device, and further comprising a second handling device independent of the first handling device and symmetric to the first handling device in a plane perpendicular to the surface, the second handling device including a second gripper and a second tilting means for tilting the second gripper around a second rotation axis symmetric to the rotation axis of the gripper, the at least one tong of the first handling device being positioned in a staggered configuration to at least one second tong of the second handling device, and further comprising a transverse actuator configured to move the gripper and the second gripper transversely to the rotation axis so to align the gripper and second gripper and allow the lifted semi-finished product to be transferred from the gripper to the second gripper.

8. The system as recited in claim 1 wherein the actuator includes a lift configured to lift the gripper and a translational actuator.

9. The system as recited in claim 1 wherein the actuator includes a crane and at least one hoist designed to be connected to the crane, and a trolley able to be moved translationally in a direction perpendicular to the direction of travel of the crane, the hoist comprising at least one lifting cable for lifting the gripper.

10. The system as recited in claim 9 wherein the vertical plane passes through the rotation axis.

11. A method for handling semi-finished metal products initially laid on a surface, comprising at least the steps of:

i. grasping the semi-finished product with a gripper;

ii. lifting the semi-finished product off the surface with an actuator able to lift the gripper from a low position towards a high position;

iii. tilting the lifted semi-finished product around a rotation axis with tilting means configured to rotate the gripper in the high position around the rotation axis;

iv. actuating the actuator to move the gripper grasping the semi-finished product, over a semi-finished product reception zone;

v. actuating the actuator to lower the gripper and set the semi-finished product down in the receiving zone in a perpendicular position, followed by actuation of the gripping means to release the semi-finished product;

vi. actuating the actuator to lift the gripper, then actuating the tilting means to rotate the gripping means towards an initial position, so that another semi-finished product laid on the surface can be grasped.

12. The method as recited in claim 11 wherein the semi-finished product in a substantially vertical position is set down in step vi in a heat recuperation system.

13. The method as recited in claim 11 wherein the gripper and the tilting means define a first handling device, and wherein a second handling device independent of the first handling device and symmetric to the first handling device in a plane perpendicular to the surface includes a second gripper and second tilting means for tilting the second gripping means around a second rotation axis symmetric to the rotation axis of the first gripping means in the plane of symmetry, the method further comprising, after step iii, the following successive steps:

actuating the second tilting means to rotate the second gripper around the second rotation axis, so that the second gripper is able to grasp the semi-finished product grasped and suspended in a vertical position by the gripper of the first handling device;

actuating the second gripper to grasp the semi-finished product in the vertical position, followed by actuation of the gripper of the first handling device in order to release the semi-finished product;

actuating the second tilting means to rotate the second gripper around the second rotation axis so that the semi-finished product turns into a position that corresponds to the semi-finished product having been turned over with respect to the initial position; and actuating the actuator or a second actuator to set the turned-over semi-finished product down on the surface.

14. The method as recited in claim 11 wherein the semi-finished metal product is a slab, a plate or a coil.

15. The method as recited in claim 11 wherein the semi-finished metal product is made of steel.

* * * * *